United States Patent [19]

Hosaka et al.

[11] 4,335,150
[45] Jun. 15, 1982

[54] LOW TEMPERATURE FOOD DRYING PROCESS

[75] Inventors: Hideaki Hosaka, Fukuyama; Setuya Kuri, Kamakura, both of Japan

[73] Assignees: Chlorine Engineers Corp.; Kun Chemical Engineers, both of Tokyo, Japan

[21] Appl. No.: 196,672

[22] Filed: Oct. 14, 1980

Related U.S. Application Data

[63] Continuation of Ser. No. 50,131, Jun. 19, 1979, abandoned.

[51] Int. Cl.³ ................. A23B 4/04; A23B 7/02; A23B 9/00; F26B 5/00
[52] U.S. Cl. .................... 426/465; 426/472; 34/27
[58] Field of Search ........... 426/465, 312, 386, 443, 426/472; 34/26, 27, 80

[56] References Cited

U.S. PATENT DOCUMENTS

| | | | |
|---|---|---|---|
| 3,257,737 | 6/1966 | Margittai | 34/27 |
| 3,257,738 | 6/1966 | Margittai | 34/27 |
| 3,765,904 | 10/1973 | de Roissart et al. | 426/386 |
| 4,104,039 | 8/1978 | Kuri et al. | 55/23 |
| 4,251,923 | 2/1981 | Kuri | 34/80 |

OTHER PUBLICATIONS

Kirk-Othmer, *Encyclopedia of Chemical Technology*, 3rd edition, John Wiley & Sons, ®1978, vol. 1, pp. 544–547, 558, vol. 2, pp. 218, 219, 225–227.

*Primary Examiner*—Raymond N. Jones
*Assistant Examiner*—Elizabeth J. Curtin
*Attorney, Agent, or Firm*—Sherman & Shalloway

[57] ABSTRACT

A low temperature food drying process dries foods to the substantially absolutely dry state without deterioration by using a low humidity drying gas. This process comprises, in combination, the steps of (a) contacting a food with a low humidity drying gas having a dew point of −75° to 0° C., to dry the food at a temperature less than 60° C., (b) passing the water-containing gas discharged from the step (a) through an adsorbing bed capable of adsorbing water preferentially to effect dehumidification of the discharged wet gas to a low humidity drying gas having a dew point of −75° to 0° C., (c) recycling the so regenerated low humidity gas having a dew point of −75° to 0° C. to the step (a) and using the regenerated gas for drying again, and (d) regenerating the adsorbing bed in which water has been adsorbed, whereby the food is dried to the substantially absolutely dry state.

8 Claims, 1 Drawing Figure

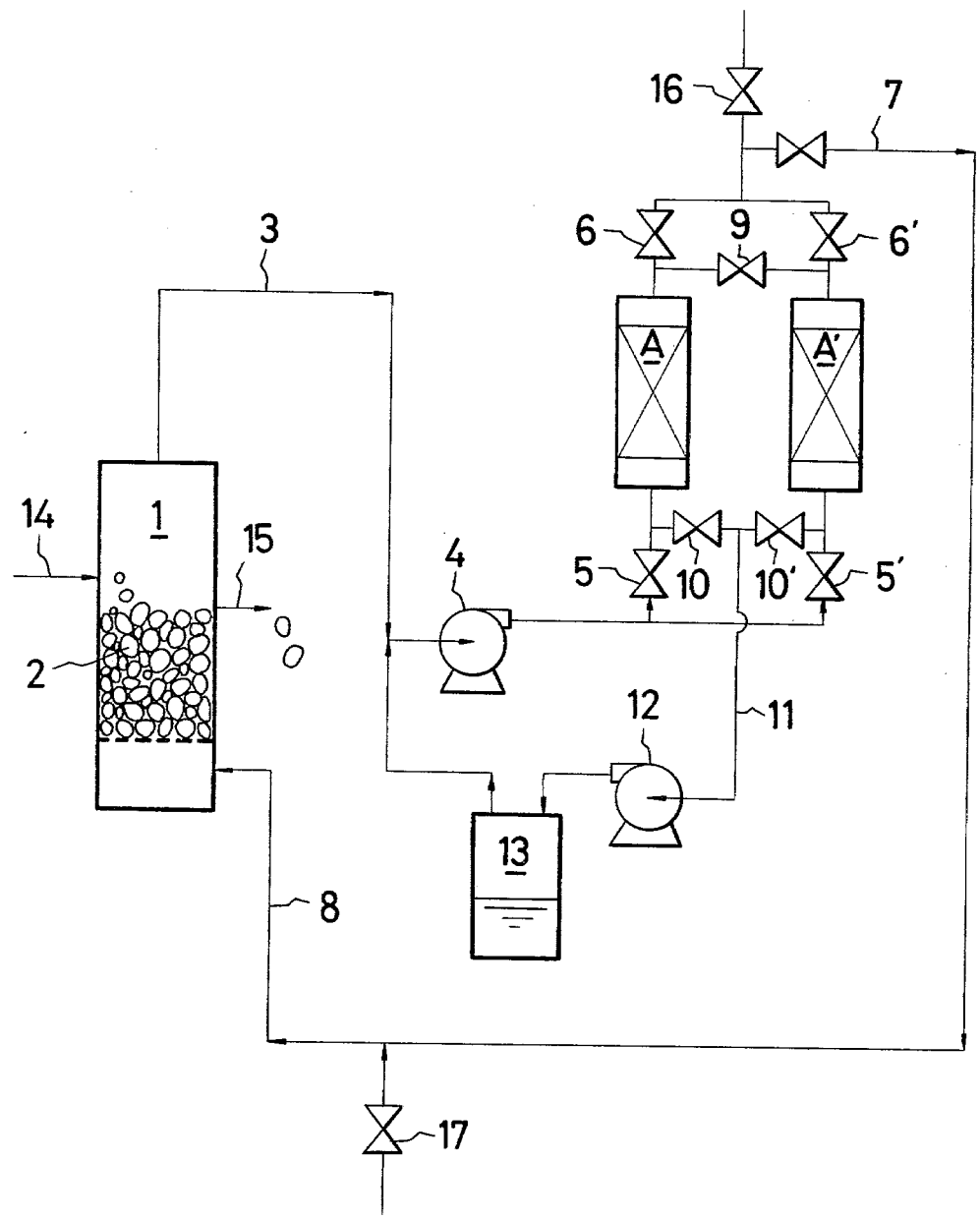

LOW TEMPERATURE FOOD DRYING PROCESS

This is a continuation, of application Ser. No. 050,131, filed June 19, 1979 now abandoned.

BACKGROUND OF THE INVENTION (1) Field of the Invention

The present invention relates to a food drying process using a low humidity drying gas.

(2) Description of the Prior Art

The hot air drying system utilizing the temperature difference as a drying promotion factor or the freeze drying system are ordinarily adopted for drying foods.

According to the freeze drying method, since a food is frozen while maintained in vacuo and its frozen water is sublimated to effect drying, extremely high vacuum is indispensably required to enhance the drying speed. Accordingly, equipment expenses and power consumption are increased. Moreover, since transmission of heat necessary for ice water sublimation has to be accomplished by heat conduction through a heat conducting plate, the food is rendered porous and the heat conductivity is reduced with advancement of the dried food zone, and therefore, the drying speed is drastically reduced and a long time is necessary for completion of drying. Still further, since the cell structure of the food is destroyed by freezing, the food becomes brittle, the structure of the food after restoration is weak and the flavor or taste of the food is inevitably depleted or changed by the drying operation.

By the hot air drying method utilizing the temperature difference as a drying promotion factor, since a large quantity of hot air shall be in contact with a food, unsaturated fatty acids and other easily oxidizable substances, which are present in the surface portion of the food, are oxidized to cause discoloration and deterioration. Since a food is composed of living bodies, if drying is carried out at a temperature higher than 30° C. over a period of a long time, the activity of enzymes may become vigorous to cause deterioration of the food. If drying is conducted at a temperature higher than 60° C., such undesirable phenomena as coagulation of proteins and case hardening of a food may take place.

As food drying means to overcome the foregoing disadvantages, in Japanese patent publication No. 25854/65 there is proposed a method for drying foods by utilizing the humidity difference as a drying promotion factor, in which a low humidity nitrogen gas separated from air by cryogenic equipment is utilized for drying food and the outgoing wet nitrogen gas is not recovered, but spent away. This system is, needless to say, uneconomical.

SUMMARY OF THE INVENTION

As a result of our research to find means to eliminate the foregoing defects and disadvantages involved in the conventional food drying methods, we found that water in foods is readily removed by contacting it with a low humidity gas, the resulting wet gas is readily and continuously dried to a low humidity gas by contacting it with a dehumidifying agent such as silica gel and the water-adsorbed agent can readily be regenerated. Based on these findings, we have now completed a food drying process in which food is placed in an atmosphere of a gas having its humidity reduced to a very low level, whereby the food can be dried to the substantially dry state while maintaining the quality of the food.

More specifically, in accordance with the present invention, there is provided a process for drying foods at low temperatures, which comprises, in combination, the steps of (a) placing a food in an atmosphere of a low humidity drying gas having a dew point of $-75°$ to $0°$ C., preferably $-70°$ to $0°$ C. and dehydrating and drying the food at a temperature less than $60°$ C., preferably ranging from $-30°$ C. to room temperature, (b) passing the wet gas discharged from the step (a) through an adsorbing bed capable of adsorbing water preferentially to effect dehumidification and drying of the gas to a low humidity having a dew point of $-75°$ to $0°$ C., (c) recycling the so regenerated low humidity gas having a dew point of $-75°$ to $0°$ C., preferably $-70°$ to $0°$ C. to the step (a) and using the regenerated gas for drying again, and (d) regenerating the adsorbing bed in which water has been adsorbed, whereby the food is dried to the substantially absolutely dry state.

BRIEF DESCRIPTION OF THE DRAWING

The drawing is a flow sheet illustrating one embodiment of the food drying process according to the present invention.

DETAILED DESCRIPTION OF THE PREFERRED EMBODIMENTS

In the process of the present invention, air, nitrogen, carbon dioxide gas or the like can be used as the drying gas. In order to prevent degradation of the quality of a food to be dried, it is ordinarily preferred to use an inert gas such as nitrogen or carbon dioxide gas as the drying gas. In order to dry a food as soon as possible, it is preferred that the humidity of the drying gas be as low as possible. However, a low humidity gas having a dew point of $-75°$ to $0°$ C. will suffice for drying, since the drying speed is in inverse proportion to the relative humidity of the gas and usual drying is accomplished in a short time effectively with that humidity. In the process of the present invention, the temperature of a food to be dried need not be elevated high for drying and the drying operation can be performed well at temperatures approximating to room temperature. In some foods, drying may be carried out at a temperature lowered to about $-30°$ C.

As the dehumidifying agent to be packed in the adsorbing bed, there can be mentioned, for example, silica gel, alumina gel, molecular sieve, active carbon etc. They may be used singly, or two or more of them may be used in the laminar state in the bed.

The steps of preparing a low humidity drying gas and regenerating the wet gas to a low humidity drying gas and the step of regenerating the adsorbing bed may be conducted according to the teachings of U.S. Pat. No. 4,104,039. More specifically, a wet gas discharged from the drying step, is introduced into one of a pair of adsorbing beds and passing of the wet gas is switched over to the other adsorbing bed before the first adsorbing bed becomes saturated with adsorbed water. Regeneration of the first adsorber is accomplished, by lowering the pressure in the bed to a pressure lower than the feed gas pressure and at the same time introducing a part of the discharged dry gas from the other adsorber. By repeating the adsorption and desorption of each bed, the dried gas is prepared and recycled to the drying vessel continuously.

According to the process of the present invention, since drying of a food is accomplished by utilizing the humidity difference between the food surface and the drying gas as a drying promotion factor, it is possible to prevent deterioration of the food, which is inevitably caused in the conventional food drying methods. Moreover, a dried food prepared by the present invention has far more natural taste and aroma than by other conventional processes. Furthermore, since the used gas from the drying step, which contains a large quantity of water, can be dehumidified, regenerated and used again by recycling it through the adsorbing bed, the food to be dried can be always placed in a low humidity gas atmosphere and therefore, the food can be dried to the substantially absolutely dry state. Another advantage attained by the present invention is that when such components as aroma inherent of a food is evaporated at the drying step, this aroma component is collected in a state of condensate at the step of desorbing water and aroma from the adsorbing bed, and the recovered aroma component can be used for restoration of the dried food.

The cells of the food dried by the process of the present invention are not damaged dried and the dried food is not different from a natural dried food and if desired, the food can be absolutely dried.

The process of the present invention will be described in detail by reference to the accompanying drawing.

Foodstuff 2 is fed to a drying vessel 1 through a pipe 14 and a low humidity drying gas of air or non-oxidizing gas such as $N_2$ or $CO_2$ is continuously blown into the lower portion of the vessel 1 through a pipe 8, to dry the food by the upcoming dry gas while the food is kept in the fixed or fluidized state. The dried food is discharged from the vessel 1 through a pipe 15 continuously or intermittently. Dry gas is circulated between the drying vessel and the adsorber A or A'.

As the food to be dried according to the process of the present invention, there can be mentioned solid foods in the granular form or in the form of a small mass, for example, grains such as wheat, corn, bean, rice and buckwheat, vegetables such as potato, carrot, onion, celery, cabbage, lettuce and spinach, cut pieces of these vegetables, fruits such as grape, apricot, apple, pineapple, banana and strawberry, cut pieces of these fruits, noodles such as spaghetti and macaroni and meats, processed livestock products, fishes and marine products.

The used gas containing a large quantity of water is discharged from the vessel 1 through a pipe 3 by a vacuum pump or compressor 4 and is fed to one of a pair of adsorbing beds A and A' capable of adsorbing water preferentially. In the paired adsorbing beds A and A', adsorption and desorption are repeatedly carried out alternately. As the dehumidifying agent to be packed in the adsorbing beds A and A', there can be mentioned, for example, silica gel, alumina gel, molecular sieve, active carbon etc., depending upon the character of the adsorbate. These dehumidifying agents may be used singly, or two or more of them may be packed in the laminar state.

First of all, adsorption in the adsorbing bed A will be described.

The gas fed through a vacuum pump or compressor 4 is introduced into the adsorbing bed A through a valve 5 and water or the vaporized substances from the food in the gas is adsorbed in the adsorbing bed A. The majority of the low humidity drying gas discharged from the adsorbing bed A is recycled to the vessel 1 through pipes 7 and 8. The gas discharged from the adsorbing bed A is substantially free of water and has a vapor pressure corresponding to a dew point of $-70°$ to $0°$ C. When the food in the vessel 1 is dried at a temperature less than $60°$ C., especially at room temperature, this low humidity gas is directly recycled to the vessel 1, and when the food is dried at a temperature of $-30°$ to $0°$ C., the low humidity gas is fed to the vessel 1 through a cooler (not shown) interposed between the pipes 7 and 8. Before the adsorbinng bed A becomes saturated with adsorbed water, passing of the gas is switched over to the other adsorbing bed A' through a valve 5'. The majority of the gas discharged from the adsorbing bed A' is recycled to the vessel 1 through a valve 6' and pipes 7 and 9, for drying in the same manner as described above.

While adsorption is being carried out in the adsorbing bed A', water adsorbed in the adsorbing bed A is desorbed in the following manner.

A part of the gas discharged from the adsorbing bed A' is introduced as the purge gas into the adsorbing bed A saturated with adsorbed water through a valve 9, and the pressure in the adsorbing bed A is reduced by means of a vacuum pump 12 (which is unnecessary when a compressor is used as the member 4). Thus, water adsorbed in the adsorbing bed A is desorbed by the purge gas and is discharged into a tank 13 through a valve 10 and a pipe 11, and water and aroma component and the like evaporated from the food are condensed in the form of a liquid and the residual gas is returned to the suction of the compressor 4. A valve 16 is for wasting the gas in the loop and a valve 17 is for a gas inlet opening when $N_2$ or $CO_2$ is used as the drying gas.

When a food containing a large quantity of water is dried according to the above procedures, the food can be dried to the substantially absolutely dry state with ease by increasing recycling number of the drying gas.

As pointed out hereinbefore, in the process of the present invention, the gas discharged from the drying step, which contains a large quantity of water, is introduced into one of a pair of adsorbing beds and passing of the gas is switched over to the other adsorbing bed before the first used adsorbing bed becomes saturated with adsorbed water, and the pressure of the gas in the first used water-adsorbed adsorbing bed is made lower than the pressure of the feed gas and a part of the gas discharged from the other adsorbing bed is fed into said water-adsorbed adsorbing bed to effect desorption. By repeating adsorption and desorption in this manner, preparation of a low humidity drying gas or regeneration of the used gas to a low humidity drying gas can be accomplished simultaneously with regeneration of the paired adsorbing beds, and therefore, the drying operation can be performed conveniently in a continuous manner.

If aroma components or other valuable components are evaporated at the drying step, such components can easily be recovered in the condensate formed by desorption of the adsorbate on the paired adsorbing beds.

The present invention will now be described in detail by reference to the following Example that by no means limits the scope of the invention.

EXAMPLE

According to the drying process illustrated in the drawing, potato, carrot, burdock and radish were separately dried by using low humidity dry air having a dew point of $-10°$ C.

Potato, carrot, burdock or radish was cut into cubes having a volume of about 1 $cm^3$, and 40 g of these cubes were placed in a drying vessel having a diameter of 41.6 mm and a height of 1000 mm. While the drying vessel was maintained at 30°, 10° or −5° C., low humidity air was passed through the vessel at a feed rate shown in Table 1, and water-containing air discharged from the drying vessel was returned to an adsorbing bed where it was regenerated to low humidity drying air, which was then recycled to the drying vessel. Obtained results are shown in Table 1.

When the so dried food was restored with water, it was found that the quality of the restored food was substantially the same as the quality of the food before drying.

When the above procedures were repeated by diminishing the size of cut cubes of the food to be dried, the drying time could be shortened.

TABLE 1

| | 30° C. Drying | | | | 10° C. Drying | | | | −5° C. Drying | | | |
|---|---|---|---|---|---|---|---|---|---|---|---|---|
| Food | Initial Water Content (Kg/Kg-D.M.) | Final Water Content (Kg/Kg-D.M.) | Gas Flow Rate (m/sec) | Drying Time (hours) | Initial Water Content (Kg/Kg-D.M.) | Final Water Content (Kg/Kg-D.M.) | Gas Flow Rate (m/sec) | Drying Time (hours) | Initial Water Content (Kg/Kg-D.M.) | Final Water Content (Kg/Kg-D.M.) | Gas Flow Rate (m/sec) | Drying Time (hours) |
| potato | 7 | 0.4 | 0.72 | 5.8 | 7 | 0.4 | 1.60 | 9.0 | 7 | 0.5 | 2.84 | 20.6 |
| potato | 7 | 0.1 | 0.72 | 7.9 | 7 | 0.1 | 1.60 | 12.3 | 7 | 0.2 | 2.84 | 24.8 |
| carrot | 12 | 0.3 | 0.72 | 7.0 | 12 | 0.3 | 1.60 | 10.9 | 12 | 0.5 | 2.84 | 22.0 |
| burdock | 6 | 0.5 | 0.72 | 5.6 | 6 | 0.5 | 1.60 | 8.4 | 6 | 0.7 | 2.84 | 16.2 |
| radish | 18 | 1.0 | 0.72 | 6.8 | 18 | 1.0 | 1.60 | 10.7 | 18 | 1.0 | 2.84 | 20.1 |
| grape | 21 | 0.8 | 0.8 | 8.5 | 21 | 0.8 | 2.0 | 12 | 21 | 0.8 | 2.84 | 21 |
| strawberry | 20 | 1.0 | 0.8 | 9.5 | 20 | 1.0 | 2.0 | 13 | 20 | 1.0 | 2.84 | 23 |

Note
D.M.: absolutely dry material

What we claim is:

1. A process for drying food at low temperatures by blowing a drying gas into the food, which comprises the steps of
   (a) feeding a food to a drying vessel,
   (b) blowing a low humidity drying gas having a dew point of −75° to 0° C. into the drying vessel,
   (c) contacting the food with the drying gas while maintaining the food at a temperature ranging from −30° to 60° C. and higher than the dew point of the drying gas, thereby drying the food and producing a water-containing gas,
   (d) introducing and passing the water-containing gas into one of a pair of adsorbing beds packed with a dehumidifying agent selected from the group consisting of silica gel, alumina gel, molecular sieve and active carbon, thereby to effect dehumidification of the water-containing gas and to regenerate the gas to a low humidity drying gas having a dew point of −75° to 0° C.,
   (e) switching over the introducing and passing of the water-containing gas to the other adsorbing bed before said one adsorbing bed becomes saturated with the adsorbed water,
   (f) feeding a part of the regenerated drying gas as a purge gas into the water-adsorbed adsorbing bed while maintaining the water-adsorbed adsorbing bed at a pressure lower than the pressure of the water-containing gas, thereby to effect desorption,
   (g) repeating the steps (d), (e) and (f), thereby to effect the regeneration of the water-containing gas to the low humidity drying gas stimultaneously with regeneration of the paired adsorbing beds,
   (h) recycling the other part of the regenerated low humidity gas to the step (b), and
   (i) recovering the dried food from the drying vessel.

2. A food drying method according to claim 1 wherein the drying gas is a non-oxidizing gas selected group the group consisting of nitrogen gas and carbon dioxide gas, and mixtures thereof.

3. A food drying process according to claim 1 wherein the drying gas is air.

4. The food drying process according to claim 1 wherein the desorbed water and the purge gas of step (f) are discharged into a tank, water is condensed in the form of a liquid and the residual gas is recycled to step (d).

5. A food drying process according to claim 4 wherein an aroma component evaporated from the food together with water is desorbed from said paired adsorbing beds and the aroma component of the food is recovered from the adsorbate.

6. The food drying process according to claim 1 wherein in step (b), the low humidity drying gas has a dew point of −70° to 0° C.; in step (c), the food is dried at a temperature of from −30° C. to room temperature; and in step (d), the regenerated low humidity drying gas has a dew point of −70° to 0° C.

7. The process of claim 1 wherein in step (b), the low humidity drying gas has a dew point of about −10° C.; in step (c), the food is dried at a temperature in the range of from −5° C. to 30° C.; and in step (d), the regenerated low humidity drying gas has a dew point of about −10° C.

8. The food drying process according to claim 7 wherein the drying gas is air.

* * * * *